United States Patent
Byren et al.

(10) Patent No.: US 8,514,284 B2
(45) Date of Patent: Aug. 20, 2013

(54) TEXTURED PATTERN SENSING AND DETECTION, AND USING A CHARGE-SCAVENGING PHOTODIODE ARRAY FOR THE SAME

(75) Inventors: Robert W. Byren, Manhattan Beach, CA (US); Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 486 days.

(21) Appl. No.: 12/640,525

(22) Filed: Dec. 17, 2009

(65) Prior Publication Data
US 2011/0261191 A1  Oct. 27, 2011

(51) Int. Cl.
*H04N 7/18* (2006.01)
*G06K 9/00* (2006.01)

(52) U.S. Cl.
USPC .......................... 348/161; 382/115; 382/124

(58) Field of Classification Search
USPC .................................................. 382/115, 124
See application file for complete search history.

(56) References Cited

U.S. PATENT DOCUMENTS

| | | | | |
|---|---|---|---|---|
| 4,053,228 A * | 10/1977 | Schiller | | 356/71 |
| 4,569,080 A * | 2/1986 | Schiller | | 382/126 |
| 5,109,427 A | 4/1992 | Yang | | |
| 5,241,606 A | 8/1993 | Horie | | |
| 5,293,873 A * | 3/1994 | Fang | | 600/437 |
| 5,675,407 A | 10/1997 | Geng | | |
| 5,892,575 A * | 4/1999 | Marino | | 356/5.01 |
| 5,973,784 A | 10/1999 | Szwaykowski et al. | | |
| 6,255,641 B1 * | 7/2001 | Johnson | | 250/208.1 |
| 6,485,981 B1 * | 11/2002 | Fernandez | | 436/71 |
| 6,678,632 B1 | 1/2004 | Iannarilli, Jr. | | |
| 6,834,798 B2 * | 12/2004 | Bove | | 235/382 |
| 6,879,712 B2 | 4/2005 | Tuncay et al. | | |
| 7,248,344 B2 * | 7/2007 | Morcom | | 356/10 |
| 7,301,608 B1 | 11/2007 | Mendenhall et al. | | |
| 7,715,084 B2 * | 5/2010 | Tan et al. | | 359/279 |
| 7,817,256 B2 * | 10/2010 | Fujii et al. | | 356/71 |
| 8,036,431 B1 * | 10/2011 | Fisher et al. | | 382/115 |
| 8,265,375 B2 * | 9/2012 | Shirley | | 382/154 |
| 2002/0016533 A1 | 2/2002 | Marchitto et al. | | |
| 2002/0097896 A1 * | 7/2002 | Kuckendahl | | 382/124 |
| 2003/0137669 A1 | 7/2003 | Rollins et al. | | |
| 2004/0100631 A1 | 5/2004 | Bashkansky et al. | | |
| 2004/0152989 A1 | 8/2004 | Puttappa et al. | | |
| 2007/0108282 A1 * | 5/2007 | Gibson | | 235/454 |
| 2007/0263208 A1 | 11/2007 | Yelin et al. | | |

(Continued)

OTHER PUBLICATIONS

Agrawal, Amit et al., "An Algebraic Approach to Surface Reconstruction from Gradient Fields," (2005).

(Continued)

*Primary Examiner* — Backhean Tiv
(74) *Attorney, Agent, or Firm* — Pierce Atwood LLP; Joseph M. Maraia

(57) ABSTRACT

A system for imaging a textured surface comprising includes a photoreceptor array having: at least a first photoreceptor and a second photoreceptor, each configured to receive electromagnetic radiation reflected from the textured surface and to generate a signal corresponding thereto; wherein the photoreceptor array is configured to detect an image of the textured surface based on the relative difference between the time of arrival of the signals from the first and second photoreceptors. Methods for imaging a textured surface and fabricating a photoreceptor array structure for imaging a textured surface are also provided.

22 Claims, 8 Drawing Sheets

(56) References Cited

U.S. PATENT DOCUMENTS

2009/0027689 A1    1/2009  Yun et al.
2010/0128109 A1*   5/2010  Banks ............................. 348/46
2011/0261191 A1*  10/2011  Byren et al. .................. 348/135

OTHER PUBLICATIONS

Aull, B.F. et al., "Geiger-Mode Avalanche Photodiodes for Three-Dimensional Imaging," vol. 13, No. 2, Lincoln Lab. Journal, pp. 335-350, (2002).
Byren, R.W., "Laser Rangefinders," The Infrared and Electro-Optical Sys. Handbook, Infrared Info. Analysis Center and SPIE, vol. 6, pp. 79-82, 90-92 (1993).
Coffey, V. C., "Thin-Disk Laser Oscillator Generates Record-Energy Short Pulses," Laser Focus World, pp. 37-39 (May 2008).
Frankot, R. et al., "A Method for Enforcing Integrability in Shape from Shading Algorithms," IEEE Transactions on Pattern Analysis and Machine Intelligence, vol. 4, pp. 439-51 (1988).
Hergert, Earl et al., "APD Arrays: Geiger-mode APD arrays detect low light," Penwell Corp. (2008).
Koechner, W., "Solid-State Laser Eng'g," 2d ed., Springer Verlag, pp. 211-15 (1988).
Miyazaki, Daisuke et al., "Polarization-Based Inverse Rendering from a Single View," IEEE 0-7695-1950-4/03 (2003).
Mounier, D. et al., "Application of Transient Femtosecond Polarimetry/Ellipsometry Technique in Picosecond Laser Ultrasonics," IOP Publ'g Ltd., pp. 1-4 (2007).
NIST Special Publication 500-245 "American Nat'l Standard for Info. Sys.—Data Format for the Interchange of Fingerprint, Facial, and Scar Mark & Tatoo (SMT) Info.," ANSI/NIST-ITL 1 2000, p. 5 (2000).
NIST Special Publication 500-271 "American Nat'l Standard for Info. Sys.—Data Format for the Interchange of Fingerprint, Facial, and Other Biometric Information," ANSI/NIST-ITL 1 2007, p. 11, 2007.
Rahmann, Stefan et al., "Reconstruction of Specular Surfaces Using Polarization Imaging," IEEE 0-7695-1272-0/01, I-149-155 (2001).
Reid, Robert B., et al, "Quantifying Surface Normal Estimation," SPIE vol. 6240, pp. 624001-1-11 (2006).
Sadjadi, Firooz "Remote Sensing, Passive Three-Dimensional Sensing by Polarimetric Imaging," SPIE (2006).
Sadjadi, Firooz et al., "Extraction of Surface Normal & Index of Refraction Using a Pair of Passive Infrared Polarimetric Sensors," IEEE 1-4244-1180-7/07 (2007).
Stucker, M. et al., "Interpapillary Lines—the Variable Part of the Human Fingerprint," Journal of Forensic Sciences, vol. 46, Issue 4 (Jul. 2001).
Tyo, J. Scott et al., "The Effects of Thermal Equilibrium & Contrast in LWIR Polarimetric Images," OSA, vol. 15, No. 23 (2007).
Wolf, Lawrence B. et al., "Constraining Object Features Using a Polarization Reflectance Model," IEEE Transactions on Pattern Analysis & Machine Intelligence, vol. 13, No. 7, pp. 635-657 (1991).
Wolf, Lawrence B., "Image Understanding from Thermal Emission Polarization," IEEE Computer Society Conf. on Computer Vision & Pattern Recognition, 0-8186-8497-6/98, pp. 625-631 (1998).
Wolf, Lawrence B., "Shape from Polarization Images," IEEE Computer Society Workshop on Computer Vision, TH0210-5/87/0000/0079, pp. 79-85 (1987).
Wolf, Lawrence B., "Spectral & Polarization Stereo Mehtods Using a Single Light Source," Proceedings, ICCV, pp. 810-820 (1987).
Wu, Tai-Pang et al., "Visible Surface Reconstruction from Normals with Discontinuity Consideration," Proceedings of the IEEE Computer Society Conf.on Computer Vision and Pattern Recognition, pp. 1793-1800, (2006).
Zhou, Y. T. et al., "Edge Detection and Linear Feature Extraction Using a 2-D Random Field Model," IEEE Transactions on Pattern Analysis and Machine Intelligence, vol. 11, No. 1, pp. 84-85 (1989).
Rao et al.; Study of Engineering Surfaces Using Laser-Scattering Techniques; Sadhana; vol. 28; Issue 3; pp. 739-761; Jun./Aug. 2003.
Cheng et al.; Artificial Fingerprint Recognition by Using Optical Coherence Tomography with Autocorrelation Analysis; Applied Optics; vol. 45; No. 36; pp. 9238-9245; Dec. 20, 2006.
Gossage et al.; Texture Analysis of Optical Coherence Tomography Images: Feasibility for Tissue Classification; Journal of Biomedical Optics; vol. 8; No. 3; pp. 570-575; Jul. 2003.
EP 10 18 7743; "Extended European Search Report"; Dated: May 25, 2012.

* cited by examiner

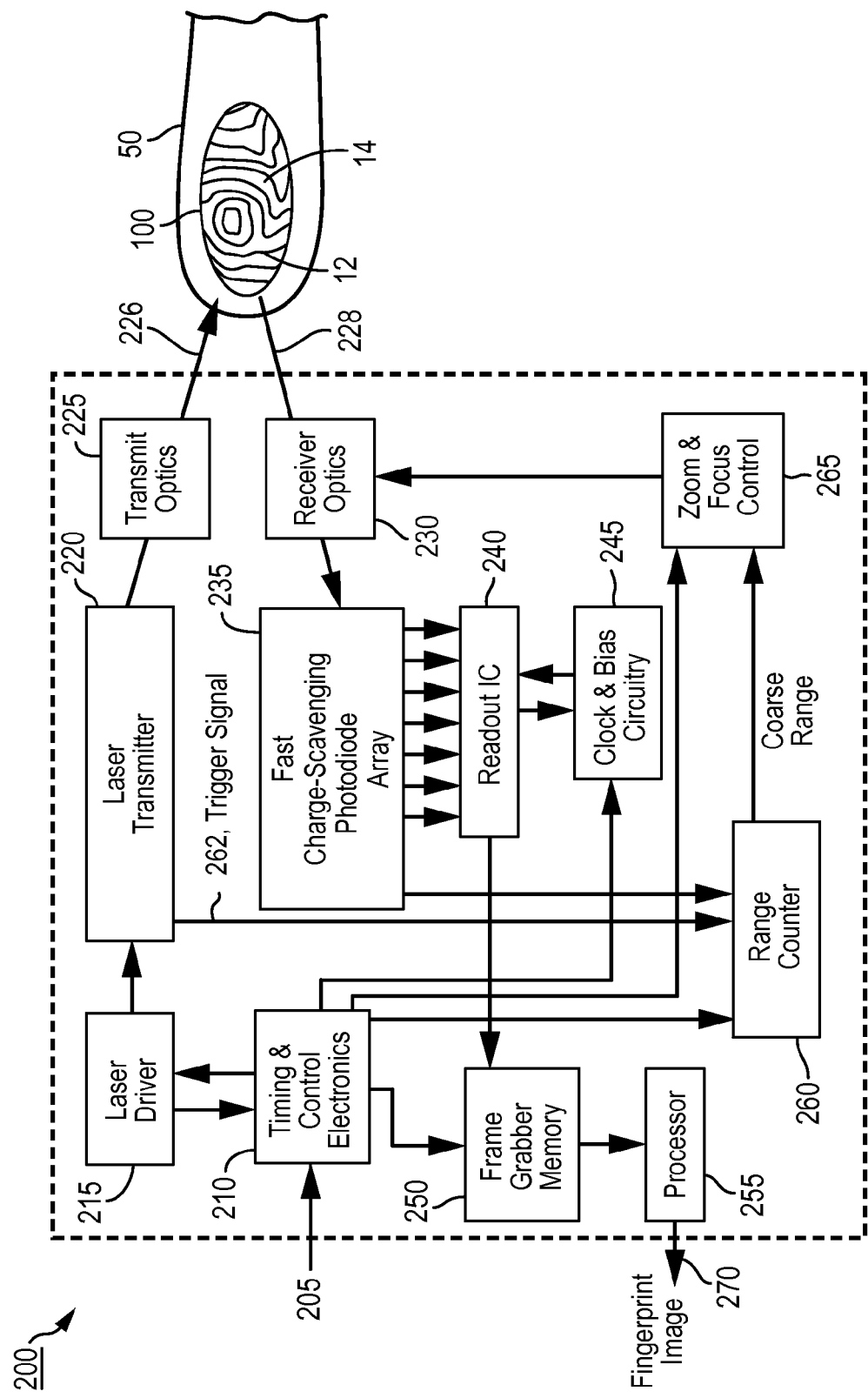

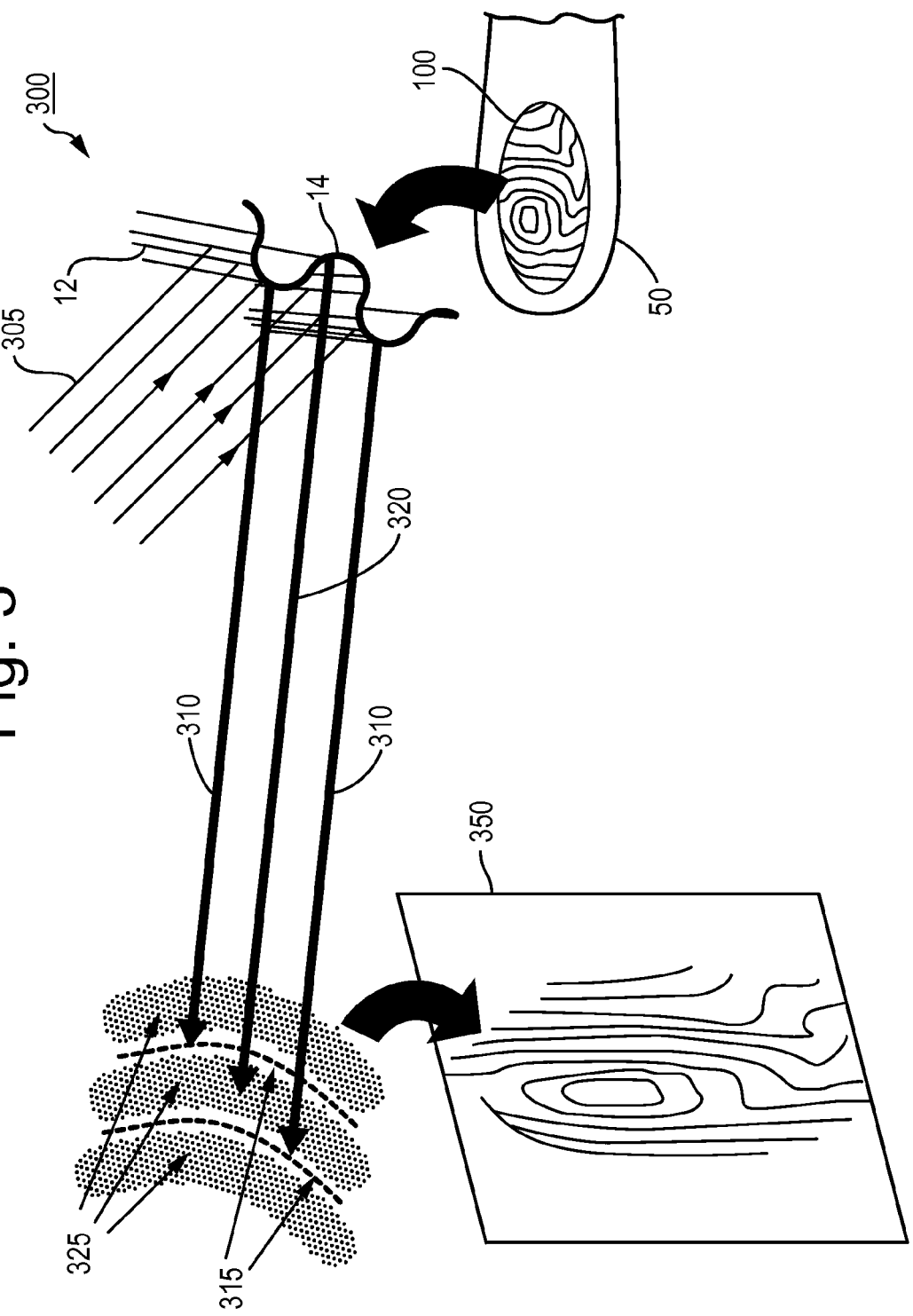

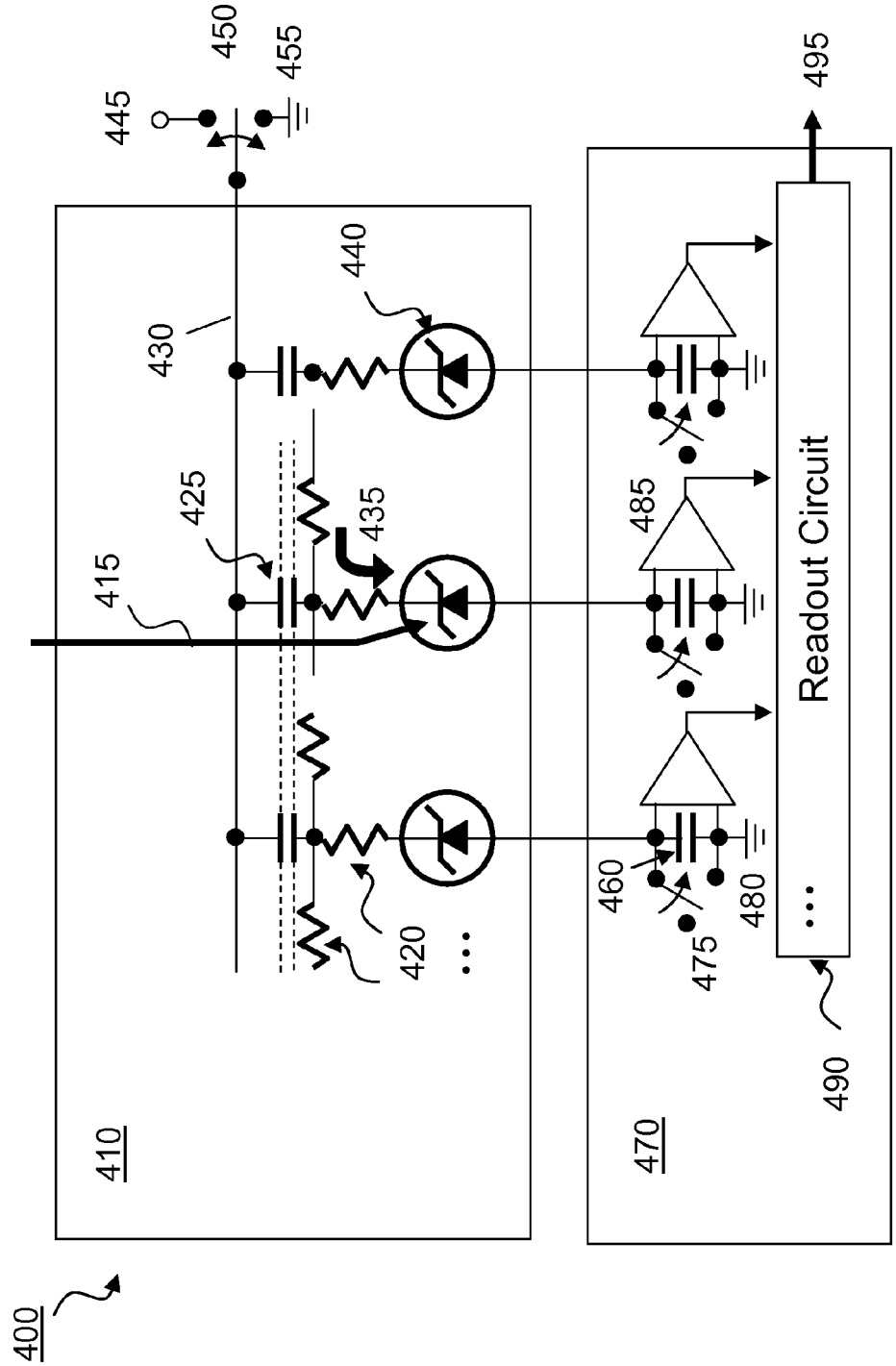

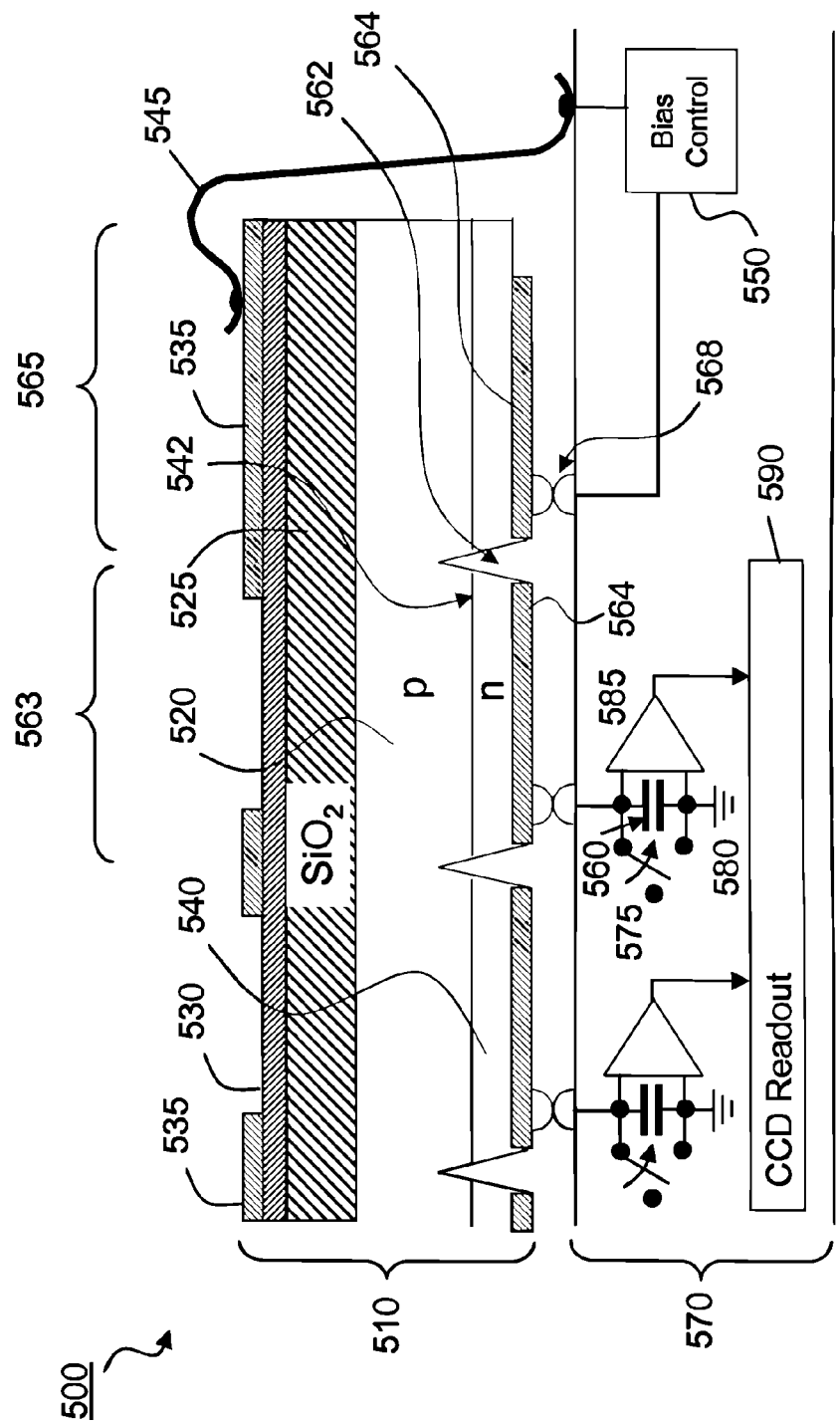

TEXTURED PATTERN SENSING AND DETECTION, AND USING A CHARGE-SCAVENGING PHOTODIODE ARRAY FOR THE SAME

BACKGROUND

This application generally relates to textured pattern sensing and detection, and more particularly, to using a charge-scavenging photodiode array for the same.

There exists a need in the fields of counterterrorism and law enforcement to identify and track suspected terrorists or felons from a distance, without the suspect's knowledge or cooperation, and without leaving a trail that might alert the suspect that he is under suspicion and by whom. A number of biometric sensing and tracking concepts have been proposed. For instance, remote fingerprinting has been identified as an attractive means for identifying and tracking of terrorists.

A problem, however, in remote, covert fingerprinting of a suspected terrorist or felon lies in the lack of contrast in detecting characteristics of the fingerprint. For instance, there may be insufficient differentiation in the reflectivity, emissivity, or polarization signature between the high points (or ridges) and the low points (or valleys) of the papillae to meet need under a broad range of conditions.

This is because passive sensors typically require some intensity, spectral, polarimetric or other form of image contrast to differentiate ridges from valleys in the dermal papillae. The subtle natural differentiation based on passive signatures may prove insufficient for discrimination except under very unusual conditions (e.g., shallow illumination grazing angles adequate to produce shadows). Many systems exist that create un-natural differentiation by selectively adding an artificial pigment to either the ridges or valleys. This is how traditional ink-on-paper fingerprints are taken.

Conventional 3-D Laser Detection and Ranging (LADAR) sensors, based on direct detection pulse-echo ranging techniques, may be considered for fingerprint detection. Ladar sensors typically include optical transceivers that use a laser to illuminate a target and an in-band optical receiver to measure the time-of-flight of the photons to and from the target to measure range. Three-dimensional (3-D) imaging ladars can operate in a "direct detection" mode, where a short pulse is transmitted to the target and the return pulse is incoherently detected by a photodetector such as an avalanche photodiode (APD) or an array of photodetectors. A 3-D image may be created by associating the measured range from a small region of the target with the position of that region in sensor angular coordinates. A single receiver channel can be scanned in two angular dimensions (such as in a television raster pattern) to produce the image. Alternatively, a one-dimensional photodiode array may be scanned in the orthogonal dimension to produce the image or a 2-D photodiode array may be used in a staring (non-scanning) fashion to generate the 3-D image. However, these direct detection ladar sensors typically do not have the range resolution necessary to measure the height difference between fingerprint ridges and valleys, which requires sub-millimeter accuracy. The counting capacity and switching speeds required for such a sensor are well beyond the capability of the most advanced high speed electronics.

Commercial ladar sensors are available which can record fingerprints using range contrast. These sensors determine whether the pixel is at the same range as a datum, such as a flat optical surface or at a different range. The size of a pixel (picture element) is the angle subtended by a resolution element in both angular dimensions. This "binary" range sensing approach can provide sharp fingerprint detail, but requires the suspect to place his/her finger or hand on a flat optical surface or window for scanning and therefore requires cooperation of the suspect and lacks covertness.

Alternatively, a ladar sensor may operate in a "coherent" mode where a coherent modulated optical waveform, such as an FM linear chirp, is transmitted to the target and the return waveform is mixed (or heterodyned) with a local oscillator beam at the detector to produce a beat carrier signal with the waveform modulation as sidebands. A processor may use a pulse compression circuit or algorithm to convert the transmitted and received chirps into electronic pulses and measure the time delay between these pulses to determine target range. To be an effective texture pattern sensing system for fingerprints and other low-relief targets, such a coherent ladar sensor would require a very high modulation bandwidth, well beyond the current state of the art and would also require the same extreme timing precision as the incoherent ladar. Furthermore, this approach is inherently very complex and would be both bulky and costly to implement.

Laser-based interferometric approaches to high resolution profilometry might also be used. However, these also require the use of a coherent source and heterodyne detection scheme with the same complexity, size, and cost disadvantages as other coherent ladar approaches.

These conventional approaches have been generally impractical in a terrorist-identification scenario where equipment cannot be pre-positioned, the range is quite variable, and/or the fingerprint must be taken remotely and covertly. The range variability may arise from several factors: the distance between the sensor and the suspect's fingers is not precisely known, the dermal papillae are on a quasi-cylindrical surface and therefore exist at different ranges, the finger is tilted with respect to the line-of-sight, and/or the target is in motion.

SUMMARY

In an embodiment, a system for imaging a textured surface comprises: a photoreceptor array including: at least a first photoreceptor and a second photoreceptor, each configured to receive electromagnetic radiation reflected from the textured surface and to generate a signal corresponding thereto; wherein the photoreceptor array is configured to detect an image of the textured surface based on the relative difference between the time of arrival of the signals from the first and second photoreceptors.

In another embodiment, a method for imaging a textured surface comprises: projecting a beam of electromagnetic radiation onto a textured surface; receiving, with a photoreceptor array, the electromagnetic radiation reflected from the textured surface, the photoreceptor array including at least a first photoreceptor and a second photoreceptor, each configured to receive electromagnetic radiation reflected from the textured surface and to generate a signal corresponding thereto; and detecting an image of the textured surface based on the relative difference between the time of arrival of the signals from the first and second photoreceptors.

In yet another embodiment, a method of fabricating a photoreceptor array structure for imaging a textured surface, comprises: forming an n-type layer on a p-type substrate to form a p-n junction for a plurality of photoreceptor; forming a thin dielectric layer on the p-type layer opposite the n-type layer, to form a bias capacitance layer; forming conductive, optically transparent thin film on top of thin dielectric layer that provides a low resistance path for uniformly charging the bias capacitance layer; and configuring the photoreceptor array structure for use in a system for imaging a textured surface.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In any embodiment, the structural components illustrated herein may not be drawn to scale. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 2 shows a block diagram of an exemplary textured pattern sensing system, in accordance with an embodiment;
FIG. 3 shows an exemplary method for textured pattern sensing, in accordance with an embodiment.
FIG. 4 shows an exemplary circuit diagram of a fast charge scavenging photodiode array, in accordance with an embodiment;
FIG. 5 shows an exemplary fast charge scavenging photodiode array, in accordance with an embodiment.

DETAILED DESCRIPTION

A methodology for textured pattern sensing is disclosed. According to one embodiment, a system for imaging a textured surface may include a photoreceptor array having multiple photoreceptors, each of which is configured to receive electromagnetic radiation reflected from the textured surface and to generate a signal corresponding thereto; such that the photoreceptor array is configured to detect an image of the textured surface based on the relative difference between the time of arrival of the signals from the adjacent photoreceptors. One or more other parameters might also be taken into effect when detecting an image, in addition to the time of arrival of the signals from the photoreceptors, such as, for example, intensity and/or color. The photoreceptor array may be a photodiode array. Of course, other photoreceptor elements could also be used.

In one implementation, a fast charge scavenging photodiode array may be used to detect electromagnetic radiation (light) reflected from a textured surface, and to image the same. The fast charge scavenging photodiode array may be configured to use crosstalk between adjacent photodiodes in order to desensitize regions of the array to delayed radiation pulses reflected from the textured surface. As such, a contrast between different portions, i.e., high and low portions, of the textured surface may be detected by the readout circuit. This contrast may correspond, for instance, to the ridges and valleys in a textured image, such as a fingerprint.

According to one embodiment, a method and system for remotely detecting textured patterns, such as, for example, taking fingerprints of suspects, is provided. In one or more embodiments, this may be clandestine, such that the suspect/target is unaware of the fingerprinting, making the methodology advantageous for personal identification and the persistent tracking challenge posed by today's terrorist threats.

While reference herein is made to fingerprints, it will be appreciated the disclosed methodology may be similarly used for detecting other textured dermal surfaces, such as: toeprints, footprints, palmprints, etc.

And, other textured patterns or surfaces may similarly be detected, such as, for example, facial features, woven clothing patterns, and a grain pattern of an item, such as leather, wood, metal, ceramic, plastic or other items.

Figure 1A:
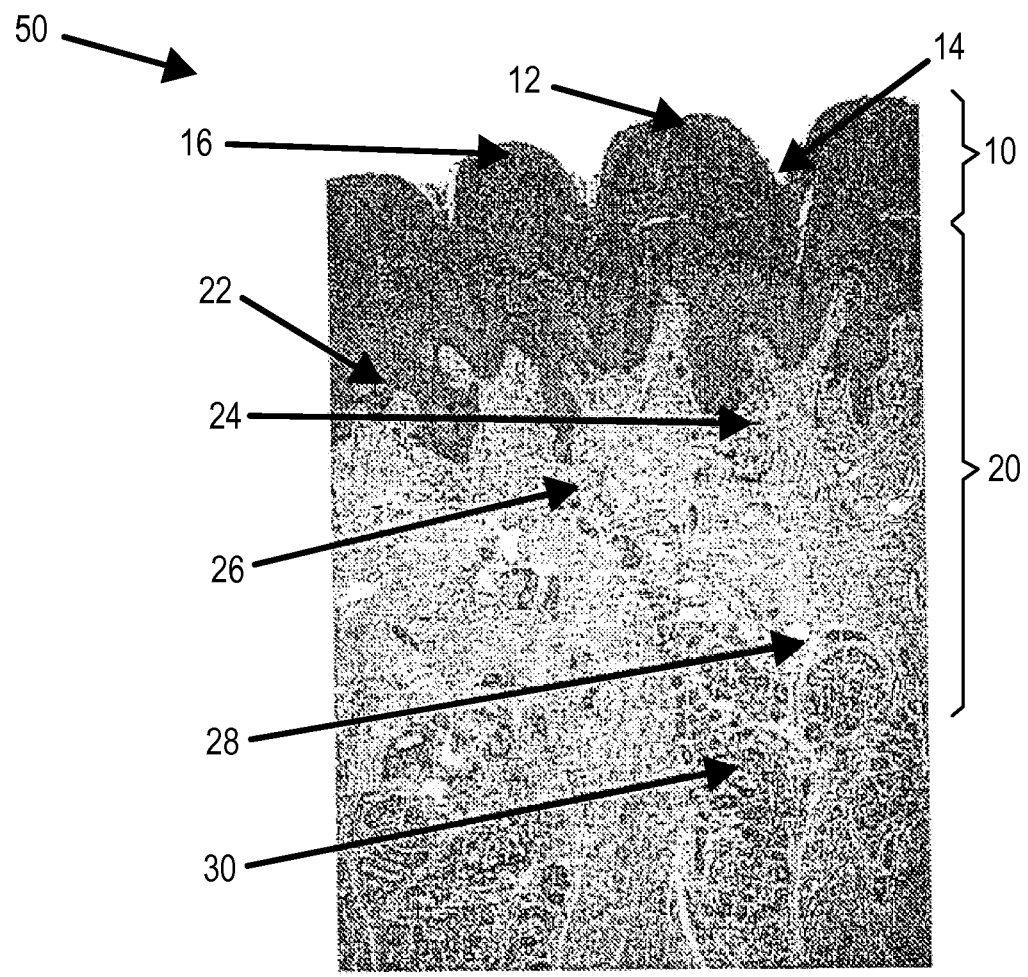
FIG. 1a shows a photograph of the cross-section of a human finger including the physiology of the dermal layers.

FIG. 1a shows a photograph of the cross-section of human finger 50 including the physiology of the dermal layers. Finger 50 includes epidermis 10 and dermis 20 layers of skin. Epidermis 10 is the outer layer of skin and includes papillary ridges 12, papillary valleys 14, and pores 16. Dermis 20 is located between epidermis 10 and fat cells 30 and includes papilla 22, tactile corpuscles and nerves 24, sweat duct and gland 26, and blood vessels 28. The configuration of papillary ridges 12 and valleys 14 is different for each person and thus, creates a unique fingerprint for each person.

Figure 1B:
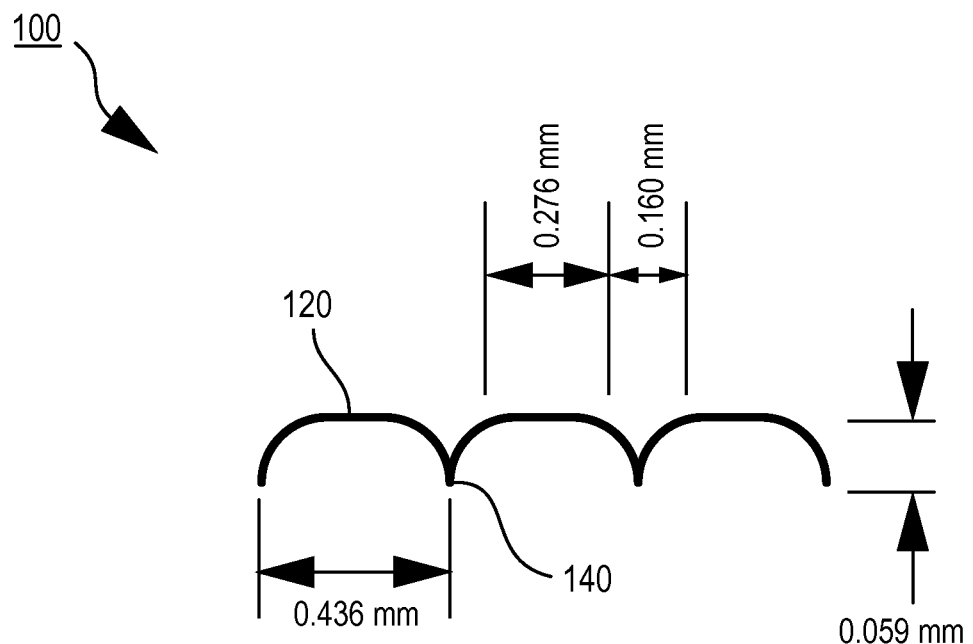
FIG. 1b shows a model of a typically human fingerprint.
Figure 6A:
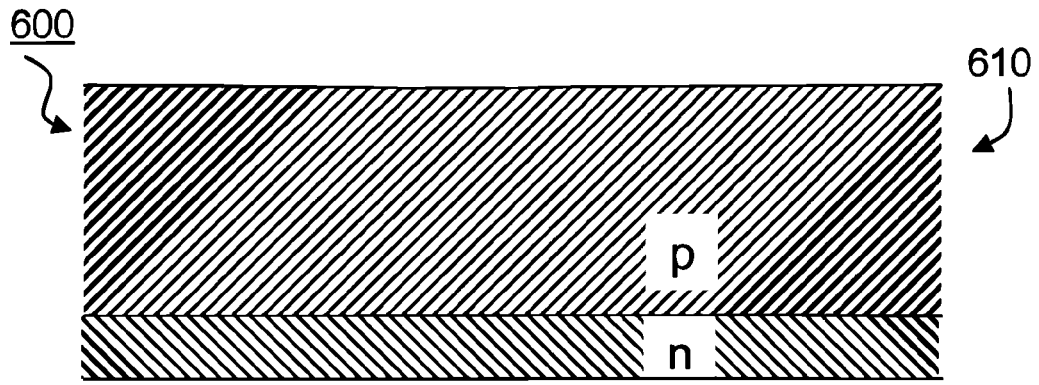
FIGS. 6a-6e show an exemplary method for fabricating a fast charge scavenging photodiode array, in accordance with an embodiment.
Figure 6B:
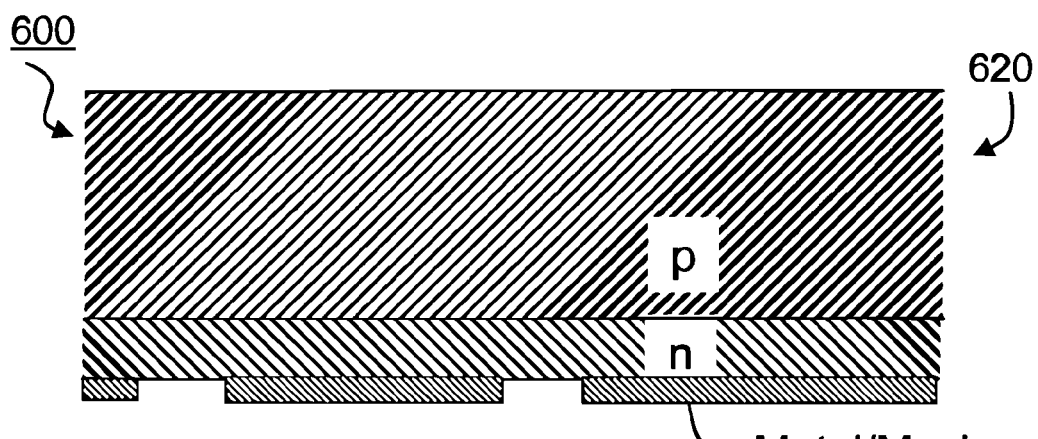
Figure 6C:
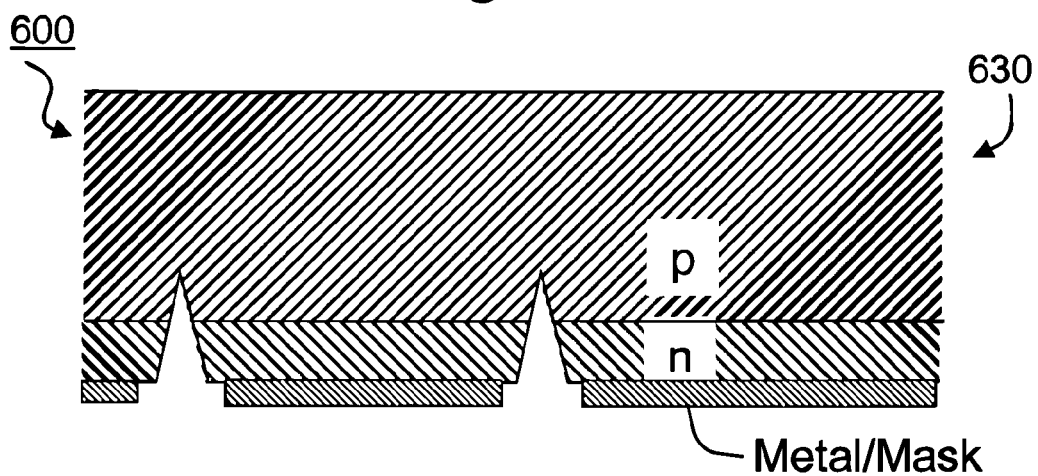
Figure 6D:
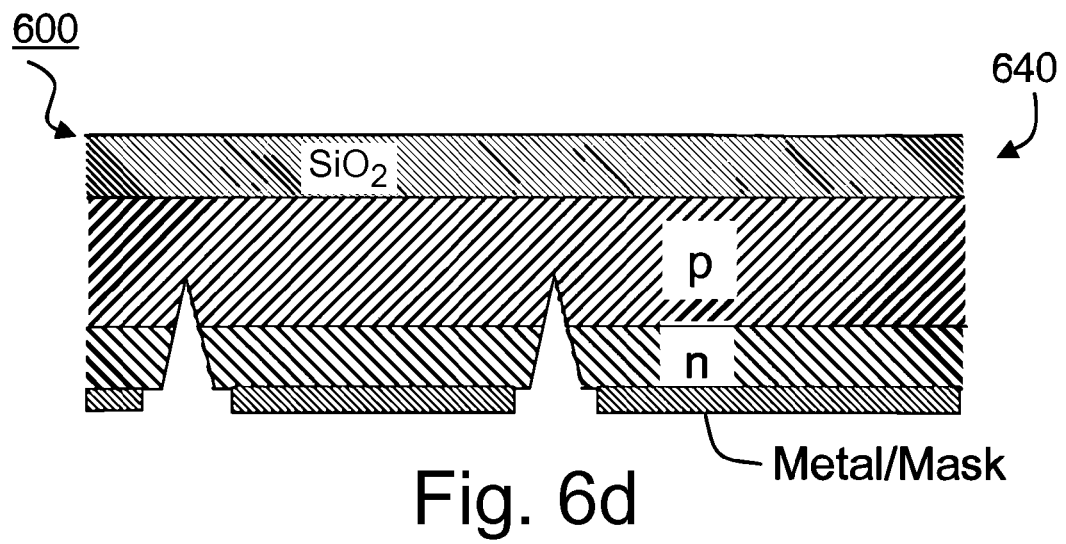
Figure 6E:
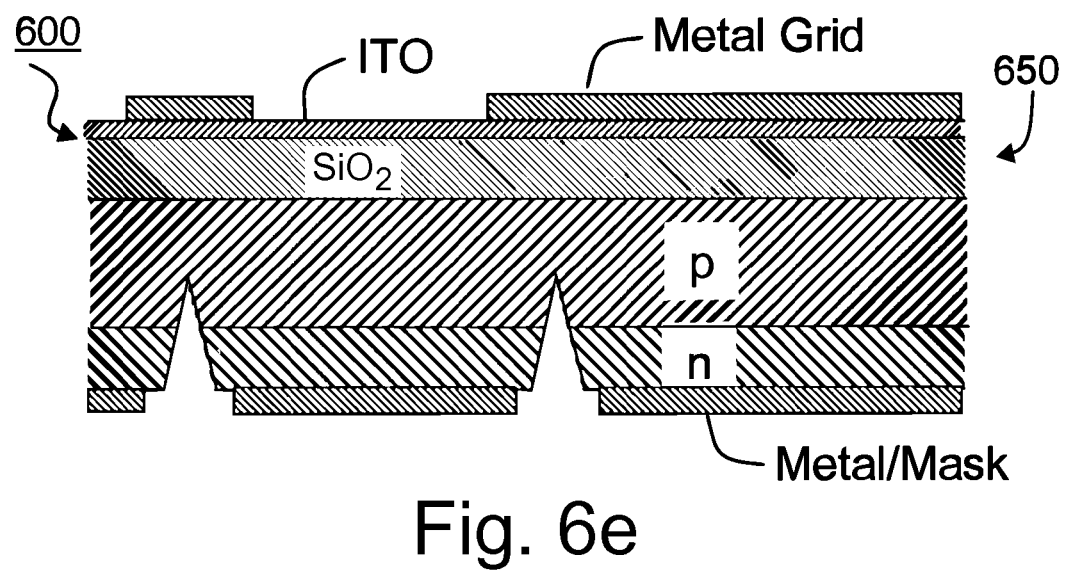

FIG. 1b shows a model of human fingerprint 100. The topography of human fingerprints based on laser profilometry has been reported, for example, by M. Stucker, et al., "Interpapillary Lines—The Variable Part of the Human Fingerprint," *Journal of Forensic Sciences*, Vol 46, Issue 4, (July 2001), herein incorporated by reference in its entirety. Their data indicates that human fingerprints have an average papillary ridge height: of 0.0590±0.0192 mm and papillary ridge spacing: 0.4355±0.0574 mm.

The median width of ridges 120, and valleys 140, may be about 0.276 mm and 0.160 mm, respectively. The convolutions defining papillary ridges 120 and papillary valleys 140 are generally not symmetric. Ridges 120 are typically "U" shaped and broader than valleys 140, while the folds in valleys 140 are substantially "V" shaped. This "V" shaped feature leads to partial trapping of incident electromagnetic radiation (light) in valleys and an contrast reduction in valley region 140 relative to the ridge region 120.

In some implementations, a self-referenced binary rangefinder receiver may be configured to implement bias capacitance crosstalk in a photoreceptor array that desensitizes un-stimulated pixels to delayed pulse fronts. The receiver may use short-pulse laser and optical imaging technology and may be fabricated using planar lithographic integrated circuit fabrication methods. For instance, a self-referenced datum, according to the model of FIG. 1b, may be used in conjunction with a "binary" contrast imager to discern between adjacent ridges and valleys of the dermal papillae of a finger.

FIG. 2 shows an exemplary textured pattern sensing system 200 for remote, covert fingerprint recording, according to an embodiment. Target finger 50 of a suspect includes papilla ridges 12 and valleys 14 which define a unique fingerprint 100.

Laser transmitter 220 is configured to generate a source of electromagnetic radiation (light) 226 that is used to illuminate target finger 50. For example, laser 220 may be a short-pulse laser transmitter 220 that is configured to operate in the spectrum beyond the normal photonic response range of the human eye (e.g., greater than about 770 nm), but within the spectral response of most un-cooled semiconductor photodiodes (e.g., less than about 2,000 nm). This may be advantageous, so that illumination 226 is not detectable (i.e., seen) by the suspect. Low average power lasers operating in the visible band may also be undetectable, if the ambient light is sufficiently high (e.g. daylight conditions).

It may be advantageous for the laser to emit radiation in a relatively broad spectral band (e.g., low temporal coherence laser) in order to reduce the deleterious effects of speckle induced graininess by averaging the speckle over target depth across the pixel.

It will be appreciated that various spectra could be used in accordance with the embodiments disclosed herein, such as visible, ultraviolet (UV), or infrared (IR).

The rise time of the laser pulse may be comparable to the difference in the round-trip time-of-flight for adjacent papilla ridges and valleys for a range of incident angles. For instance, a pulse rise time of about 0.4 ps or shorter may be adequate for projected papillary depths of about 0.060 mm for a variety of viewing geometries. Short-pulse lasers are available that can generate picosecond class single-pulse outputs with pulse energies in the 10 µJ range. One such laser, for instance, which may be used, is a mode-locked Yb:YAG thin-disk laser oscillator with stable pulse operation with an average output power of 50 W at a repetition rate of 3.8 MHz. A maximum pulse energy of 13.4 µJ may occur at a pulse duration of 1.36 ps. The spectral bandwidth, at 55 W average power, may be about 0.88 nm at a center wavelength of 1030.3 nm. See V. C. Coffey, "Thin-Disk Laser Oscillator Generates Record-Energy Short Pulses," *Laser Focus World*, pp. 37-39, May 2008, herein incorporate by reference in its entirety.

Transmit optics 225 may be provided that are configured to shape, focus, and/or correct aberrations of beam of electromagnetic radiation (light) 226 and direct it towards target finger 50. Optics 225 may include one or more of lens, polarizers, filters, etc., as known in the art.

Return radiation 228, reflected from target finger 50, is imaged by receiver optics 230 and onto the surface of fast charge-scavenging photodiode array 235, which is sensitive to only the earliest pulse returns from target finger 50, as will be described in more detail herein. Receiver optics 230 may include, for example, a narrow bandpass optical filter to reduce the reflected solar background and/or thermal background flux.

Fast charge-scavenging photodiode array 235 may include a plurality of photodiodes. It may be formed of a photosensitive material such as silicon, indium gallium arsenide (In-GaAs), or mercury cadmium telluride (HgCdTe). Fast charge-scavenging photodiode array 235 may be connected to readout integrated circuit (ROIC) 240 that is configured to amplify the video signal from each array element and transfer the video data from each row and column of the 2-D array to a buffer memory or frame grabber 250. ROIC 240 may include, for example, a charge coupled device (CCD).

Fast charge-scavenging photodiode array 235 may be biased by charging a distributed capacitance, which may be essentially a dielectric layer (e.g., $SiO_2$) that is integral to the planar focal plane array structure.

The photodiode bias may be configured to drive the photodiode's p-n junction near the breakdown voltage, in a condition known as the "linear mode," or above the breakdown voltage, in a condition known as the "Geiger mode."

Photodiodes are p-n junction semiconductor diodes that are sensitive to electromagnetic radiation through a photovoltaic process. For instance, incident photons with photon energies greater than the bandgap energy of the semiconductor can generate electron-hole pairs within the depletion layer of the diode which drift under the influence of a reverse bias. This generates a current that is added to the normal leakage current of the diode.

The Geiger mode is an unstable condition in which essentially no photocurrent flows until a photon is absorbed, driving the junction into a rapid "avalanche" state. A conductive layer disposed between the capacitive layer and the photodiode elements may be configured to provide a parasitic distributed resistance allowing each photodiode element to share the bias charge within the capacitive layer with its neighboring photodiode elements. The resistance may be very small, thereby minimizing the equivalent RC time constant in the conduction path of each photodiode.

When photons are reflected off ridges 12 of the dermal papillae and received by fast charge-scavenging photodiode array 235, they are absorbed near the p-n junction of one or more photodiodes thereof. The resultant avalanche signal current in each photodiode discharges a portion of the shared capacitance in a localized region around the stimulated photodiode. This photocurrent, in turn, charges a secondary capacitance that is located within ROIC 240 and connected on the other side of the photodiode p-n junction. The region surrounding the stimulated photodiode(s) is now biased well-below the breakdown voltage of the p-n junction such that the avalanche gain of the photodiode is substantially lowered. Ideally, the discharge is so great for the adjacent photodiodes that they are temporarily incapable of generating a significant photocurrent.

The voltage on the secondary capacitance may be amplified and a corresponding sensible charge may be transported within ROIC 240. In one implementation, ROIC 240 may include a charged-coupled device (CCD) readout to transport this sensible charge. ROIC 240 may be connected to photodiode array 235 using indium bump technology (as shown) or other interconnect technologies. After return radiation 228 from a pulse of laser transmitter 220 has been received, ROIC 240 records the location of just the high portions or ridges 12 to form the textured pattern, in this case, an image corresponding to fingerprint 50. The pixels associated with the low portions or valleys 14 have been desensitized and thus, the photons received from these regions are largely undetected, if detected at all.

This approach does not require all ridges 12 to be at the same height or at the same range relative to the sensor. In fact, the influence function associated with the spatial pattern of bias discharge may be less than the distance between adjacent ridges 12. The result is a high quality fingerprint image of the unsuspecting suspect which is relatively independent of dermal irregularities, finger shape and/or finger orientation.

Frame grabber 250 may be configured to capture individual images generated by photodiode array 235. The output of frame grabber 250 may be sent to processor 255 which may be configured to perform image processing, such as binary image formation functions. The output of processor 255 may be a standard video interface format (such as, for example, IEEE RS 170) or a standard computer interface format (serial or parallel).

Range counter 260 may also be included, which drives a focus control servo mechanism 265 attached to receiver optics 230 to maintain the fingerprint image in sharp focus on fast charge scavenging photodiode array 235. Range counter 260 may be initiated with trigger signal 262 generated from laser transmitter 220 when a pulse is initiated, and is stopped when the pulse is received from target finger 50. The accuracy of the range counter may be comparable to the depth of focus of receiver optics 230. In some implementations, range counter 260 may be a conventional digital counting circuit.

Timing and control electronics 210 may be configured to direct laser transmitter 220 to fire and manage the timing of the bias and readout cycles for photodiode array 235 using clock and bias circuitry 245. Such systems are known in the art for controlled laser pulse timing.

The field-of-view (FOV) of textured pattern sensing system 200 may be minimized by using separate imager and video tracker systems (not shown) which are configured to point the sensor line-of-sight (LOS) toward target finger 50. This pointing function might also be accomplished by the human operator using a small display, such as, for example, a liquid crystal display (LCD) device. With the imager, video tracker, and LOS pointing means, the field-of-view of textured pattern sensing system 200 may need only be the angular size of the target's hand.

The earliest return radiation 228 corresponding to pulse 226 may be registered as signals and stored in frame grabber 250. The focal plane of photodiode array 235 may be configured so that photodiodes adjacent to those that register the earliest return pulses are sufficiently desensitized that the signal amplitude from any late return pulses can be discriminated relative to the earliest pulses.

When textured pattern sensing system 200 is trained on target finger 50, each papilla ridge 12 registers as an early return pulse and is recorded as a signal in frame grabber 250, thereby recording pattern of ridges 12 in the fingerprint. Because a given size region surrounding the location of each early return pulse is desensitized, the late pulse returns from papilla valleys 14 may be recorded at a lower amplitude, thereby providing the intensity contrast between ridges 12 and valleys 14 necessary for a good fingerprint image.

An algorithm based on a model that is used to discriminate the ridges from valleys, may be operationally loaded in processor 255.

The size of the desensitized region may be determined by the expected spacing between papilla ridges 12, by using a model, for instance, as shown in FIG. 1b. In one implementation, the desensitized region may be less than half the average projected distance between ridges over the anticipated range of sensor-to-target distances, incidence angles, and/or fingerprint types. Assuming a projected ridge spacing of 0.435 mm (i.e., approximately 2 ridges per mm), the lateral extent of the desensitized region would be about 0.2 mm.

One specification established for the scanning resolution for exchange of fingerprint information specifies 19.96 pixels per millimeter (ppmm). See "American National Standard for Information Systems—Data Format for the Exchange of Fingerprint, Facial, and Scar Mark & Tatoo (SMT) Information," *ANSI/NIST-ITL* 1-2000, p. 5, 2000, herein incorporated by reference in its entirety. This corresponds to approximately a 0.05 mm pixel spacing, or an average of about 8.7 pixels between ridges 12. For reflected electromagnetic radiation (light) generally normal to finger 50 and a sensor-to-target distance of about 3 m, the desired angular resolution of textured pattern sensing system 200 may be about 16.7 µradians. Achieving this resolution, and assuming diffraction-limited optics and a laser wavelength of 800 nm may require 5.8 cm (or 2.3 inch) diameter optics.

Zoom and focus control 265 may provide image focus capabilities in order to minimize image blur at the focal plane of photodiode array 235. Under the geometric conditions described above, the approximate depth-of-field may be about 8.7 mm, which sets the precision of range counter 260. To achieve this precision, using laser transmitter 220 as the rangefinder source, may require a pulse width shorter than 0.58 ns, which is consistent with, yet less demanding than, the picosecond pulsewidth that may be required for charge scavenging.

Zoom and focus control 265 may provide zoom capabilities in order to maintain a near constant distance between papillary ridges 12 in the image of the finger at the focal plane of photodiode array 235. The ranging requirement for zoom control may be substantially less demanding than for focus control.

Alternatively, a separate laser transmitter (not shown) with a separate rangefinder receiver (not shown) may be used for zoom and focus control 265. Furthermore, other auto-focusing control systems (e.g., acoustic rangefinder, coherent laser rangefinder, or image-based system designed to peak spatial frequency in the image) may be used separately, or in conjunction with, a course laser rangefinder for zoom and focus control 265.

Fingerprint image 270 may be output from processor 255. Image 270 may be stored in memory (or database), displayed, printed, etc. Depending on the needs of law enforcement or government personnel, fingerprint image 270 may be run through a database of fingerprint images, to identify suspects and/or terrorists.

FIG. 3 shows an exemplary method 300 for detecting a textured pattern in accordance with an embodiment.

Electromagnetic radiation emitted 305, for instance, from laser transmitter 220 (FIG. 2) may be directed towards a textured pattern. In the embodiment shown, the textured pattern is fingerprint 100 of finger 50, including a unique configuration of papilla ridges 12 and valleys 14 which define an individual's fingerprint. Of course, other textured patterns may be similarly detected.

Some of electromagnetic radiation that is reflected from finger 50 propagates towards detector 350. Reflected radiation includes a portion of radiation 310 reflected from ridges 12 and a portion of radiation 320 reflected from valleys 14 of the finger print 100. Note, for ease of clarity, radiation absorbed by finger 50 and/or reflected in directions other than toward detector 350 have been omitted.

Because the distance traveled for radiation 310 from fingerprint 100 to detector 350 is slightly less than for radiation 320, radiation 310 will impinge upon detector 350 slightly sooner than radiation 320. Radiation 310 will be detected by one or more photodiodes of detector 350, which are each initially configured in a high-gain mode, which may be the Geiger mode, and will cause a current to flow, depleting the bias voltage across a bias capacitance that is shared with adjacent photodiodes, and thereby substantially reducing the gain of these adjacent photodiodes. As such, when radiation 320 impinges on detector 350, it will not be detected, or if so, at a lower amplitude than for radiation 310.

Ridges 12 thus appear as "lighter" areas (higher signal), and valleys 14 appear as "darker" areas (lower signal). The contrast between the darker and lighter areas forms an image of the textured surface. In this case, the image detected corresponds to fingerprint 100. Video can be generated by frame grabber 250 and processor 255 (FIG. 2). The polarity of the image may be reversed so that areas of higher signal appear "darker," and conversely.

FIG. 4 shows an exemplary circuit schematic for fast charge-scavenging photodiode array 400, according to an embodiment.

Fast charge-scavenging photodiode array 400 generally includes detector array 410 coupled to readout integrated circuit (ROIC) 470.

Under the command of timing and control electronics 210 (FIG. 2), clock and bias circuitry 245 switches bias line 450 to charge bias position 445 thereby charging distributed bias capacitance 425 (e.g., a continuous capacitance layer in the semiconductor structure of detector array 410 that is modeled as a parallel array of isolated capacitors) and through forward-biased photodiode array elements 440 to a predetermined negative bias supply voltage 445. Distributed bias capacitance 425 may be connected to bias line 450 via transparent conductive layer 430.

During the charge bias cycle, an array of shunt switches 475 may also be closed in ROIC circuit 470 setting the individual read capacitors 460 to a bias voltage (e.g., zero volts). Prior to the laser firing, bias line 450 may be switched to ground 455, causing photodiodes 440 to become reversed-biased at a level near their breakdown voltage. Array of shunt switches 475 is then opened at this time allowing the photocurrent delivered through photodiode 440 from stimulation by incident laser pulse 415 to charge corresponding read capacitor 460.

Photons from incident laser pulse 415 that are absorbed within one or more photodiodes 440 of detector 410 will cause the p-n junction to avalanche, thereby discharging a region of distributed bias capacitance 425 around the incident laser pulse through the parasitic distributed resistors 420. Distributed resistance may be kept very small to allow the charge in the neighboring regions to be scavenged by the stimulated photodiode before the neighboring elements are illuminated. The spatial extent of bias capacitor 425 discharge is determined by the uneven current sharing through the distributed resistance, which reduces the current drawn from more remote capacitance regions 425 and also delays the discharge time (due to the increased RC time constant for bias capacitance 425) in these remote regions. For very remote regions, photodiodes 440 will remain fully sensitized, allowing those regions to respond to subsequent pulse fronts from papillae ridges 12 that may be at a slightly longer range due to dermal irregularities, the cylindrical shape of target finger 50, and/or its tilt with respect to the line-of-sight of textured pattern sensing system 200. If the voltage at charge bias position 445 is sufficient to bias photodiodes 440 in the condition corresponding to the "Geiger mode" of operation, a single photon may be sufficient to trigger the avalanche process resulting in a high discharge current.

When incident light pulse 415 is received by a given photodiode 440 from papilla ridges 12, current 435 flows through photodiode 440 charging individual read capacitor 460 associated with photodiode 440. The portion of the distributed bias capacitance within the influence region of the photodiode (i.e., "effective" bias capacitance) and the read capacitance act to redistribute the charge during the on-time of photodiode 440. The capacitance value of read capacitors 460 is selected such that the reduced bias voltage across photodiodes 440 for the delayed pulse elements is insufficient to drive the detector into avalanche multiplication, and the charge transfer to read capacitors 460 for these delayed pulse elements is substantially reduced relative to the early pulse elements.

In other implementations, switching of the supply voltage between charge and bias modes may be accomplished by supplying a positive bias voltage at ground 480 of read capacitors 460, closing shunt switches 475 (e.g., zero voltage across read capacitors 460), and setting bias line 450 to ground 455. Different polarity photodetectors 440 may also be used, thereby requiring a change in the polarity of the supply voltage and other circuit elements. This may be particularly advantageous, for instance, if semiconductors other than silicon are used in the photodetector array. Linear APD and P-I-N detectors may also be used in place of the Geiger Mode APD.

Avalanche photodiodes (APDs) may be operated at a sufficiently high reverse bias that the drift field within the semiconductor accelerates the photo-carriers, causing avalanche multiplication of the photocurrent through multiple impact ionizations. The gain of an APD is the net increase in the number of signal carriers generated through this avalanche multiplication process. See R. W. Byren, "Chapter 2, Laser Rangefinders," *The Infrared and Electro-Optical Systems Handbook, Volume* 6, J. Accetta and D. Shumaker exec. ed., C. Fox ed., Infrared Information Analysis Center and SPIE, pp. 90-92, 1993, herein incorporated by reference in its entirety.

Geiger-mode APDs are biased sufficiently high such that the avalanche can be triggered by a signal photon impinging thereupon. Thus may saturate the output, yielding a response that is non-linear with respect to the incident radiation intensity. See B. F. Aull, et al, "Geiger-Mode Avalanche Photodiodes for Three-Dimensional Imaging," Vol. 13, No. 2, *Lincoln Laboratory Journal*, pp 335-350, (2002), herein incorporated by reference in its entirety.

Readout circuit 490 may be used in ROIC 470 to achieve different benefits (i.e., high speed, low signal droop, low crosstalk, etc.). In one implementation, readout circuit 490 may be a "Bucket Brigade" readout circuit having a charge coupled device (CCD) architecture in which charges in the CCD transfer elements may be proportional to the voltage measured across read capacitors 460. An algorithm may be used by processor 255 to convert this signal from read capacitors 460 into a binary image of the fingerprint, which is essentially a spatial map of the papillae ridges. For instance, a binary threshold function may be used as the algorithm.

Voltage amplifiers 485 may take one of several forms known in the art, provided the input impedance is sufficiently high that it does not significantly discharge the read capacitance during the read cycle. If the difference in charge on read capacitors 460 between the ridges and valleys is sufficiently large (e.g., Geiger Mode APD), voltage amplifiers 485 may not be necessary and may be eliminated from the circuitry of ROIC 470. Read capacitors 460 may be incorporated as an integral part of readout circuit 490 CCD transfer elements.

A more complex image forming algorithm might also be used, which takes into account the spatial distribution and magnitude of read capacitors 460 charge, the electronic response of the photodetector circuitry to the incident pulse illumination, and the relative timing of the leading edges of the laser pulses from different fingerprint features across the finger topography with various tilts and rotations.

FIG. 5 shows an exemplary semiconductor structure 500 of the fast charge-scavenging photodiode array 510 coupled to readout integrated circuit (ROIC) 570, according to an embodiment. It will be noted that the layer thicknesses and array pitch are not drawn to scale. The physical structures shown in FIG. 5 generally correspond to the circuit shown schematically in FIG. 4.

Photodiode array 510, shown in the upper part of the figure, may be interconnected to ROIC 570, for example, using indium "bump" technology or other interconnected technology. Metal grid 535 on the illumination surface may be interconnected to the bias control 550 of ROIC 570 by using wire bond 545. Other interconnect techniques may similarly be used. In another implementation, bias control circuit 535 may be separate from ROIC 570.

In the implementation shown, the photodiodes are formed from p-type silicon substrate 520 which serves as the absorption region of photodiodes 440 (FIG. 4). In some implementations, a second p-type region (not shown) may be provided on p-type silicon substrate 520 to increase the field strength near the junction in order to enhance carrier impact ionization. Other light absorbing semiconductor materials might also be used instead of silicon.

N-type region 540 is provided on p-type silicon substrate 520 to form p-n junction 542 of the photodiode. Thin metallization layer 564 may be evaporated on n-type silicon layer to form bonding pads for electrical interconnection with ROIC 570. The individual photodiode elements may be isolated from one another using one of many isolation methods generally known in the semiconductor manufacturing business. A two-dimensional grid of "V-grooves" 562 form separate n-type "mesa" regions 563 as well as surrounding guarding structure 565 which acts as a getter for stray carriers.

Thin dielectric layer 525 (such as $SiO_2$) on p-type layer 520 forms distributed capacitance 425 (FIG. 4). Conductive, transparent thin film 530, such as indium tin oxide (ITO), may be deposited on top of thin dielectric layer 525. And, thin metallization layer 535 may then be evaporated on the thin film 530, and etched in the regions above the active portion of the photodiode elements, to form path 430 (FIG. 4) that is electrically connected to bias control 550 via wire bond 545.

Beneath photodiode array 510 may be a readout integrated circuit (ROIC) 570 that may include read capacitor 560, voltage amplifier 585, and shunt switch 575 for each detector element and a charge-coupled device (CCD) readout 590 that transfers signal from each array element in the form of electric charge along the rows and columns of the array, ultimately forming a serial data stream of charge packets.

As shown in FIG. 5, voltage amplifiers 585 may be configured to sense the voltage across read capacitors 560. In other implementations, "differential" voltage amplifiers (not shown) may be configured to sense the voltage across adjacent read capacitors 560, thereby measuring the intensity contrast between two detector elements directly.

FIGS. 6a-6e show an exemplary method 600 for fabricating fast charge-scavenging photodiode array structure 500 shown in FIG. 5, according to an embodiment. For example, various lithographic processing steps may be utilized as generally known for semiconductor device fabrication.

In step 610 (FIG. 6a), an n-type layer may be grown, diffused, or implanted on a p-type substrate to form the p-n junction of the photodiodes. In some implementations, a second p-type layer (not shown) may be epitaxially grown, diffused, or implanted to increase the field strength near the junction in order to enhance carrier impact ionization.

Next in step 620 (FIG. 6b), the individual photodiode elements may then be masked to isolate them from one another using one of many isolation methods generally known in the semiconductor manufacturing business. In an embodiment, a thin metal pattern may be used as the mask which serves a dual purpose as the bonding pads for the photodiodes and the circumferential guard structure.

In step 630 (FIG. 6c), a sequence of "V-grooves" may then be etched through the mask or milled (e.g., ion beam milling) to form separate n-type regions. Metal bonding pad contacts may be formed for connection to ROIC 570 (FIG. 5). Additional processing steps (not shown) may be utilized to passivate the edges of the V-grooves to minimize surface leakage at the p-n junction (due to surface states) and thereby provide a uniform current-vs.-voltage (I-V) characteristic across the junction.

For most implementations, it may be desirable to thin the back side of the array to limit the depth of the p-type absorption region. This may be performed, for instance, using a well-controlled chemical etch. In step 640 (FIG. 6d), a thin dielectric layer, such as $SiO_2$, may be thermally grown or deposited on the p-type layer which will form a distributed capacitance layer.

And, in step 650 (FIG. 6e), conductive, transparent thin film, such as indium tin oxide (ITO) may be deposited on top of thin dielectric layer which will provide a uniform bias voltage across the distributed capacitance layer. Thin metallization layer may then be deposited on the ITO thin film to form low resistance path 430 (FIG. 4), and later etched in the regions above the active portion of the photodiode elements to open transparent windows for incident light pulse 415 (FIG. 4) to pass therethrough.

Of course, it will be appreciated that different processing steps and different planar structures may be used without departing from the spirit and scope of the present invention.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A system for imaging a textured surface comprising:
    a photoreceptor array including:
        at least a first photoreceptor and a second photoreceptor, each configured to receive electromagnetic radiation reflected from the textured surface and to generate a signal corresponding thereto;
    wherein the photoreceptor array is configured to detect an image of the textured surface based on a difference between time of arrival of the generated signals from the first and second photoreceptors,
    wherein the first photoreceptor and the second photoreceptor are each initially configured to operate in a high gain mode, and
    wherein first radiation reflected from a first portion of the textured surface that impinges on the first photoreceptor causes the first photoreceptor to generate current through the first photoreceptor and the current causes the second photoreceptor to become temporarily unbiased so as to not operate in the high gain mode, such that, when second radiation reflected from a second portion of the textured surface impinges on the second photoreceptor in a lower gain mode it will be substantially undetected by the second photoreceptor.

2. The system according to claim 1, further comprising: a light source configured to project electromagnetic radiation onto the textured surface.

3. The system according to claim 2, wherein the light source is a pulsed laser.

4. The system according to claim 3, wherein the laser has a pulse rise time less than 1 picosecond.

5. The system according to claim 2, wherein the light source is configured to project electromagnetic radiation in the visible, ultraviolet (UV), or infrared (IR) spectrum.

6. The system according to claim 2, wherein the light source is configured to project electromagnetic radiation that is generally undetectable by a human under ambient conditions.

7. The system according to claim 1, further comprising: a display device configured to display the detected textured surface.

8. The system according to claim 1, wherein the photoreceptor array further comprises:
    a distributed bias capacitance; and
    a plurality of read capacitors.

9. The system according to claim 8, further comprising:
    a first array of switches that are configured to be closed in order to initially set bias capacitance to a bias voltage and then subsequently switched to a ground potential to cause the photoreceptors to become reversed-biased at a level near a respective breakdown voltage; and a second array of switches that are configured to be closed in order to initially set the read capacitors to a bias voltage and then switched open allowing photocurrent from incident radiation pulse to charge corresponding read capacitors.

10. The system according to claim 1, wherein the first and second photoreceptors are linear avalanche photodiodes, Geiger mode avalanche photodiodes, or P-I-N photodiodes.

11. A method of fabricating a photoreceptor array structure for imaging a textured surface, comprising:
   forming an n-type layer on a p-type substrate to form a p-n junction for a plurality of photoreceptors;
   forming a thin dielectric layer on the p-type layer opposite the n-type layer, to form a bias capacitance layer;
   forming conductive, optically transparent thin film on top of thin dielectric layer that provides a low resistance path for uniformly charging the bias capacitance layer; and
   configuring the photoreceptor array structure for use in the system according to claim 1.

12. The method according to claim 11, further comprising forming a metal grid on top of the conductive, optically transparent thin film.

13. The method according to claim 11, further comprising forming an additional p-type layer on the p-type substrate.

14. The method according to claim 11, further comprising coupling the photoreceptor array to a readout integrated circuit.

15. The method according to claim 14, wherein the readout integrated circuit includes a read capacitor associated with each photoreceptor.

16. The method according to claim 14, wherein the readout integrated circuit includes a voltage amplifier.

17. The method according to claim 14, wherein the readout integrated circuit comprises a "Bucket Brigade" readout structure having a charge coupled device (CCD) architecture.

18. A method for imaging a textured surface comprising:
   projecting a beam of electromagnetic radiation onto a textured surface;
   receiving, with a photoreceptor array, the electromagnetic radiation reflected from the textured surface, the photoreceptor array including at least a first photoreceptor and a second photoreceptor, each configured to receive electromagnetic radiation reflected from the textured surface and to generate a signal corresponding thereto, wherein the first photoreceptor and the second photoreceptor are each initially configured to operate in a high gain mode; and
   detecting an image of the textured surface based on a difference between time of arrival of the generated signals from the first and second photoreceptors by sensing a first radiation reflected from a first portion of the textured surface when it impinges on the first photoreceptor, the first radiation causing the first photoreceptor to generate current through the first photoreceptor thereby causing the second photoreceptor to become temporarily unbiased so as to no longer operate in the high gain mode, such that a second radiation reflected from a second portion of the textured surface and which impinges on the second photoreceptor is caused to be substantially undetected by the second photoreceptor.

19. The method according to claim 18, wherein the textured surface comprises: a fingerprint, a toeprint, a footprint, a palmprint, a woven clothing pattern, or a grain pattern of an item.

20. The method according to claim 18, wherein the first portion of the textured surface are ridges and the second portion of the textured surface are valleys.

21. The method according to claim 20, wherein ridges are imaged as relatively lighter areas, and valleys are imaged as relatively darker areas.

22. The method according to claim 18, further comprising:
   covertly and remotely directing the beam of electromagnetic radiation onto the textured surface in a manner which is generally undetectable by a human under ambient conditions.

* * * * *